United States Patent
Rabis et al.

(10) Patent No.: US 11,892,650 B2
(45) Date of Patent: Feb. 6, 2024

(54) METHOD FOR PRODUCING AN OPTICAL COMPONENT HAVING A COATED INTERNAL STRUCTURE AND OPTICAL COMPONENT PRODUCED BY SAID METHOD

(71) Applicant: JENOPTIK Optical Systems GmbH, Jena (DE)

(72) Inventors: Tina Rabis, Niedertreba (DE); Joerg-Peter Schmidt, Amt Wachsenburg (DE); Benjamin Hoehn, Jena (DE)

(73) Assignee: Jenoptik AG, Jena (DE)

( * ) Notice: Subject to any disclaimer, the term of this patent is extended or adjusted under 35 U.S.C. 154(b) by 0 days.

(21) Appl. No.: 18/016,083

(22) PCT Filed: Jul. 7, 2021

(86) PCT No.: PCT/EP2021/068777
§ 371 (c)(1),
(2) Date: Jan. 13, 2023

(87) PCT Pub. No.: WO2022/013029
PCT Pub. Date: Jan. 20, 2022

(65) Prior Publication Data
US 2023/0213776 A1 Jul. 6, 2023

(30) Foreign Application Priority Data

Jul. 14, 2020 (DE) .................... 10 2020 118 548.0
Dec. 15, 2020 (DE) .................... 10 2020 133 528.8

(51) Int. Cl.
*G02B 27/09* (2006.01)
*G02B 1/10* (2015.01)
*G02B 27/10* (2006.01)

(52) U.S. Cl.
CPC .............. *G02B 27/09* (2013.01); *G02B 1/10* (2013.01); *G02B 27/1073* (2013.01); *G02B 2207/101* (2013.01)

(58) Field of Classification Search
CPC ...... G02B 27/09; G02B 1/10; G02B 27/1073; G02B 2207/101; G02B 27/10;
(Continued)

(56) References Cited

U.S. PATENT DOCUMENTS

| 5,224,200 A | 1/1993 | Rasmussen et al. |
| 6,254,241 B1 * | 7/2001 | Unger .................. F21V 7/16 |
| | | 359/857 |

(Continued)

FOREIGN PATENT DOCUMENTS

| CN | 103746062 A | 4/2014 |
| DE | 101 03 100 A1 | 8/2002 |

(Continued)

*Primary Examiner* — Balram T Parbadia
(74) *Attorney, Agent, or Firm* — Muncy, Geissler, Olds & Lowe, P.C.

(57) ABSTRACT

The invention relates to a method for producing an optical component consisting of at least two individual parts, which together enclose an open cavity, wherein the inner sides delimiting the cavity are coated or structured, and from which previously material has been removed in zones in the region of the free aperture, wherein said region is recoated and the individual parts are connected to one another by wringing. The wringing height is greater than the removal height plus the height of the coating. The invention also relates to optical components which are produced according to this method.

15 Claims, 4 Drawing Sheets

(58) Field of Classification Search
CPC .... G02B 27/0994; G02B 6/0096; G02B 1/11; G02B 1/12; G02B 5/02; G02B 5/08; G02B 5/20; F21V 8/00; F21V 7/04
See application file for complete search history.

(56) References Cited

U.S. PATENT DOCUMENTS

| | | | |
|---|---|---|---|
| 6,517,210 B2* | 2/2003 | Peterson | H04N 9/3173 353/121 |
| 6,594,424 B2 | 7/2003 | Schmidt et al. | |
| 7,120,346 B2* | 10/2006 | Sawanaka | G02B 6/10 385/133 |
| 7,210,822 B2* | 5/2007 | Liu | G02B 27/0994 362/346 |
| 2002/0114167 A1* | 8/2002 | Schmidt | G02B 27/09 362/551 |
| 2002/0114573 A1* | 8/2002 | Schmidt | G02B 27/0994 385/146 |
| 2002/0118946 A1* | 8/2002 | Wagner | G02B 27/0994 385/146 |
| 2004/0126077 A1* | 7/2004 | Strobl | G02B 27/09 385/133 |
| 2006/0227424 A1 | 10/2006 | Wang et al. | |
| 2006/0227676 A1* | 10/2006 | Tanaka | G03F 7/70075 369/44.23 |
| 2007/0024981 A1 | 2/2007 | Duncan et al. | |
| 2008/0118215 A1* | 5/2008 | Chen | G02B 6/0096 385/133 |
| 2008/0157004 A1 | 7/2008 | Chang et al. | |
| 2013/0094221 A1 | 4/2013 | Goletz et al. | |
| 2013/0188254 A1 | 7/2013 | Li et al. | |
| 2014/0016219 A1* | 1/2014 | Lai | G02B 6/0096 359/850 |
| 2018/0239120 A1* | 8/2018 | Brukilacchio | G02B 5/005 |
| 2020/0233193 A1* | 7/2020 | Fan | G03B 21/2066 |

FOREIGN PATENT DOCUMENTS

| | | |
|---|---|---|
| DE | 10 2010 046 342 A1 | 3/2012 |
| DE | 10 2017 121 210 A1 | 3/2019 |

* cited by examiner

METHOD FOR PRODUCING AN OPTICAL COMPONENT HAVING A COATED INTERNAL STRUCTURE AND OPTICAL COMPONENT PRODUCED BY SAID METHOD

TECHNICAL FIELD

The invention relates to an optical component, in particular a light integrator, embodied as a hollow integrator and primarily having a light exit surface that is square, rectangular, triangular, round or else has some other shape.

Light integrators find application wherever a particularly uniform illumination optical assembly is desirable. That may be the case e.g. in projection lithography, in wafer inspection or in laser material processing. One example of devices in which light integrators are used is projectors, in particular beamers.

In principle, light integrators can be differentiated into those which guide the light within a rod-shaped solid body, which either is clad by a material having a higher refractive index or is provided with a mirror layer (rod or fiber integrators), and those which are formed by a tubular hollow body, generally reflectively coated on the inside (hollow integrators).

Rod or fiber integrators are principally used for circular beam cross sections and, in comparison with the hollow integrators, have the disadvantage of higher light losses owing to not completely avoidable absorption by the material that guides the radiation further.

In both types of light integrators mentioned, the radiation of a light beam introduced into a light entrance surface of the light integrator with an arbitrary energy distribution over the beam cross section, e.g. a Gaussian energy distribution, is homogenized by multiple reflections within the light integrator. The light beam leaves the light integrator via a light exit surface with a specific cross-sectional geometry, such as circular or rectangular, with an at least approximately homogenous energy distribution over the radiation cross section, a so-called top-head distribution. The aperture of the introduced light beam is equal to the aperture of the emerging light beam.

Hollow integrators are principally used for angular beam cross sections, e.g. rectangular or square cross sections, and, in comparison with the rod or fiber integrators, have the disadvantage that they cannot be produced from one piece. Even if a hollow body required therefor is produced monolithically, a sufficiently uniform interior reflective coating could not be applied to the interior surface, which is why hollow integrators are in principle composed of at least two component parts.

PRIOR ART

One such hollow integrator is known in accordance with the generic type from the description of the prior art in US 2005/0213333 A1.

US 2005/0213333 A1 proceeds from prior art formed by a light integrator consisting of four assembled flat glass plates, which jointly enclose a parallelepipedal cavity. The glass plates each have a reflectively coated interior side, an exterior side, two longitudinal sides and two end sides. The glass plates are arranged relative to one another such that the glass plates opposite one another form an inner and respectively an outer pair of glass plates. In that case, the longitudinal sides of the inner pair of glass plates bear against the interior sides of the outer pair of glass plates in such a way that the longitudinal sides of the inner pair of glass plates project beyond the longitudinal sides of the outer pair of glass plates. In order to form a hollow body having a rectangular cross section deviating from a square cross section, the glass plates have a different width in pairs.

The glass plates are connected among one another by means of strips of adhesive introduced in the notches formed by the longitudinal sides situated one on top of another.

The applicant of US 2005/0213333 A1 is of the opinion that such a light integrator is disadvantageous, owing to the embodiment and arrangement of the glass plates relative to one another and their exclusive cohesive connection. Such a light integrator cannot absorb forces and would easily be deformable.

In order to eliminate these disadvantages, in accordance with the subject matter of US 2005/0213333 A1, the glass plates are embodied as component parts that are paired with respect to one another by virtue of the longitudinal sides of the glass plates being embodied with mutually corresponding cutouts and projections, via which the glass plates are connected to one another by positively locking engagement in addition to the cohesive connection by means of the strips of adhesive.

Such a hollow integrator certainly has higher stability, but it is more complicated to produce if only because geometrically different glass plates are required instead of only identical glass plates.

Both hollow integrators having a rectangular cross section which are known from the prior art are assembled from different glass plates, this being disadvantageous for their production. Furthermore, they are designed with the dimensioning of the glass plates for only one specific cross-sectional size of the light exit surface.

DE 103 36 694 A1 discloses a light integrator, here a light mixing rod, which is assembled from identically fashioned mirror elements and is designed for only one specific cross-sectional size.

U.S. Pat. No. 5,224,200 discloses an optical system having a light integrator, referred to here as homogenizer, which is assembled from four identical rectangular glass rods. The cross section of the rectangular cavity formed is intended to be varied by the glass rods being arranged displaceably relative to one another. The light integrator here does not form a rigid assembly in which the glass rods are permanently fixedly connected to one another.

US 2006/0227676 A1 discloses a light integrator, presented here as an optical element for homogenizing the energy distribution of a beam, this light integrator being assembled from four rectangular reflectors, wherein the latter, by virtue of their being arranged in a manner displaced differently with respect to one another, can together enclose a cavity of varying size. There is no indication of how the reflectors are connected among one another in order to ensure that the reflectors form exactly a right angle with one another.

U.S. Pat. No. 3,536,536 discloses a light integrator, here called an optical tunnel. It consists of four identical glass plates fixedly connected to one another by means of an adhesive connection. For this purpose, cutouts filled with adhesive are introduced in longitudinal sides of the glass plates. The interior sides of the adjacent glass plates bear against the longitudinal sides and thus against the adhesive. During assembly, any excess adhesive can spread in an uncontrolled manner and also penetrate into the cavity formed by the glass plates.

There is no indication that the four glass plates for forming a light integrator are connected to one another in any other way than terminating flush with one another, which means that only one cross-sectional size of the cavity can be realized.

DE 102010026252 A1 discloses a light integrator consisting of four identical, parallelepipedal glass plates. The latter each have an interior side and an exterior side, having a length and a width, and also a first and a second longitudinal side and two end sides having a height h. The interior sides are subdivided in each case into a reflectively coated, optically effective surface and an adhesive surface enclosing a groove running in the longitudinal direction and adjoining the optically effective surface.

What is disadvantageous and problematic about all these solutions is the use of adhesives, which entail contaminations which necessitate outgassing during production and moreover are subject to aging processes. Moreover, internal structures can only be coated after production.

Problem Addressed by the Invention

The invention addresses the problem of providing a stable, easily producible optical component having internal structuring or internal coating for shaping a beam cross section which eliminates the disadvantages mentioned above and in particular manages without adhesives. In addition, the intention is to avoid the in part poor layer quality during subsequent coating.

Solution to the Problem

The problem is solved by means of a device as claimed in claim 1 and also a method as claimed in claim 12 and a use as claimed in claim 15.

Advantages of the Invention

The invention presents a stable, easily producible optical component having internal structuring or internal coating.

DESCRIPTION

The invention describes an optical component. The latter comprises a number N of individual parts which are wrung together at at least N−1 planar joining surfaces. By way of example, the optical component can comprise four individual parts, which can advantageously be wrung together at three or four joining surfaces. If the four individual parts are wrung together at three joining surfaces, the fourth joining surface can bear against the first connection surface without being wrung. Certain tolerances can then be compensated for. If the four individual parts are wrung together at four joining surfaces, an even stabler connection of the individual parts is attained. Higher accuracies of the individual parts may then be necessary, however. The planar joining surfaces can each be path-connected, advantageously simply connected, i.e. and additionally null-homotopic.

Wringing and wringing together can be understood to mean an adhesive connection of the individual parts by way of molecular or atomic forces of attraction. This connection method is occasionally also referred to as adhesion by sliding. Cold welding may occur in the process.

A cavity is present in a cross section of the optical component, said cavity being arranged in the interior of the optical component and being surrounded by the N individual parts.

A first individual part $ET_1$ has at least one first coating surface with a first coating applied thereon. The first coating surface has at least one first planar partial region. The first coating surface can also be embodied such that it is completely planar; in this case, the planar partial region can constitute the complete coating surface.

The first individual part has at least one first joining surface $FF_1$ from the set of the at least N−1 joining surfaces. According to the invention, the first coating on the first planar partial region is set back by a parallel offset $\Delta t$ in relation to the first joining surface $FF_1$. The parallel offset can be related to the surface of the layer. The parallel offset $\Delta t$ is less than 200 nm (nanometers); advantageously, it can be less than 100 nm and particularly advantageously less than 50 nm. This makes it possible to prevent optical losses from occurring in the set-back offset zones of the optical component. Advantageously, the set-back offset can be greater than 10 nm, particularly advantageously greater than 20 nm. Thickness tolerances of the coating can be compensated for as a result. The parallel offset $\Delta t$ can arise by virtue of the first planar partial region of the coating surface being set back by an absolute value t in relation to the first joining surface and by virtue of the coating having a thickness d<t. The parallel offset $\Delta t = t-d$ then results as the difference between these two absolute values. The thickness d of the coating can be for example between 20 nm and 10 µm, advantageously between 50 nm and 5 µm, and particularly advantageously less than 2 µm. The coating can comprise one or more individual layers.

The geometric extents of the individual parts, in particular the edge lengths, can be greater than 10 mm.

According to the invention, the first coating is arranged in the interior of the optical component. In a cross-sectional representation, the coating can represent a delimitation of the cavity. The coating can likewise be surrounded by individual parts.

Advantageously, the joining surfaces can be free of coatings, as can the corresponding mating surfaces to be wrung (also referred to as connection surfaces) of the respectively adjacent individual part. That can have the advantage that the basic materials from which the individual parts are produced can be directly wrung together. The optical component according to the invention can be particularly advantageous if an optical coating on which wringing is not possible is intended to be used.

The optical component can be provided for at least one design wavelength and/or a design wavelength range. The design wavelength or the design wavelength range can be the spectral range for which the optical component is provided as intended. Advantageously, the parallel offset $\Delta t$ can be less than the design wavelength and/or the minimum value of the design wavelength range. Optical losses can be avoided particularly effectively as a result. The design wavelength/design wavelength range can lie in the ultraviolet spectral range and/or in the EUV range. One or more of the wavelengths 405 nm, 248 nm, 193 nm, 157 nm and/or 13.5 nm can be encompassed.

Advantageously, the N individual parts can all be wrung together at at least N planar joining surfaces. That can mean that the N individual parts are wrung cyclically, i.e. in each case the i-th individual part $ET_i$ to the i+1-th individual part $ET_{i+1}$ for i=1 ... N−1 and the N-th individual part $ET_N$ to the first individual part $ET_1$. A particularly stable optical component can be produced as a result. However, stringent requirements in respect of the mechanical precision of the individual parts may be necessary in order to avoid a mechanical overdetermination.

One specific embodiment of the optical component can be characterized in that the distance between the first coating and a surface of an opposite second individual part is less than the design wavelength. By way of example, exactly two individual parts can be present and either exactly one joining surface can be present or all joining surfaces can be arranged in a common plane.

One specific embodiment of the optical component can be characterized in that a further coating surface adjoining the first coating surface is present on the first individual part, and extends outside the plane of the first coating surface.

One specific embodiment of the optical component can be characterized in that at least three individual parts are present and a second coating adjoining the first coating is present on a second individual part from the set of the N individual parts and a third coating adjoining the second coating is present on a third individual part from the set of the N individual parts. Gaps having a width up to the upper limit according to the invention of the parallel offset $\Delta t$ can be disregarded in this consideration.

One specific embodiment of the optical component can be characterized in that and/or in that the cavity, apart from gaps possibly present and having a gap width smaller than the design wavelength and/or the minimum value of the design wavelength range, is completely delimited by coatings.

One specific embodiment of the optical component can be characterized in that and/or in that the cavity, apart from gaps possibly present and having a gap width up to the upper limit according to the invention of the parallel offset $\Delta t$, is completely delimited by coatings.

Advantageously, one or a plurality or all of the optical coatings can be embodied as one of the following coatings:
  partly or completely reflective coating,
  antireflection coating
  dichroic coating
  polarization-dependently reflective coating
  absorbent coating Advantageously, one or a plurality or all of the optical coatings can comprise at least one metallic layer and/or at least one inorganic dielectric layer and/or at least one organic layer. Likewise advantageously, one or a plurality or all of the optical coatings can be embodied as an inorganic layer system.

Advantageously, provision can be made of a beam path running through at least one individual part and at least partly through the first coating. The main propagation direction of the light can be a z-direction of a rectangular coordinate system xyz. The normal to the first coating surface can have a component in the z-direction; specifically, the normal can be oriented at 45° to z or can be oriented exactly in the z-direction.

Likewise advantageously, provision can be made of a beam path running completely outside the individual parts in the cavity. Advantageously, the cavity can be completely or partly delimited by reflective coatings. The main propagation direction of the light can be a z-direction of a rectangular coordinate system xyz. The coating surfaces can each have a normal having a component perpendicular to z; specifically, the normals to the coating surfaces can be oriented perpendicularly to z.

Advantageously, the cavity in the cross section can have a shape which is square, rectangular, triangular, pentagonal, hexagonal, round, cylindrical or elliptic. The cross section can be an xy-section, i.e. can lie in an xy-plane. In one specific embodiment, the cavity can have a cross-sectional area that varies over different cross-sectional planes. Alternatively, the cross section can be constant over the z-direction.

A method according to the invention for producing an optical component comprises the following steps:
  providing N individual parts where N>1 comprising
    providing at least one first individual part $ET_1$ having at least one planar first surface on which at least one first coating surface and a first joining surface $FF_1$ are provided,
    providing at least one first connection surface $VF_1$ on the first surface or on a first side surface of the first individual part,
    providing at least N−1 further individual parts $ET_2$ ... $ET_N$, each having a joining surface $FF_n$ and a connection surface $VF_n$, wherein n=2 ... N,
  superficially removing material by means of a surface processing method in respect of at least the first coating surface as far as a predetermined depth t in relation to the first joining surface,
  applying a coating and/or a structure having a predetermined thickness d on the first coating surface, where d t holds true,
  connecting the individual parts by wringing a respective joining surface $FF_n$ onto the following joining surface $VF_{n+1}$ where n=1 ... N−1, such that the first coating surface with the applied first coating and/or structure lies in the interior of the optical component.

Advantageously, the method can additionally comprise connecting the last individual part $ET_N$ to the first individual part $ET_1$ by wringing the last joining surface $FF_N$ onto the first connection surface $VF_1$.

Advantageously, the surface processing method can comprise ion beam figuring (IBF), wet-chemical etching, dry-chemical etching, plasma etching and/or zonal polishing.

Advantageously, the use of an optical component can be for at least one of the following purposes:
  as polarization beam splitter
  as dichroic long-pass, short-pass or bandpass filter
  as hollow light guide
  as light funnel
  as diffusor
  as mirror.

EXEMPLARY EMBODIMENTS

The invention is explained below on the basis of exemplary embodiments.

Figure 1:
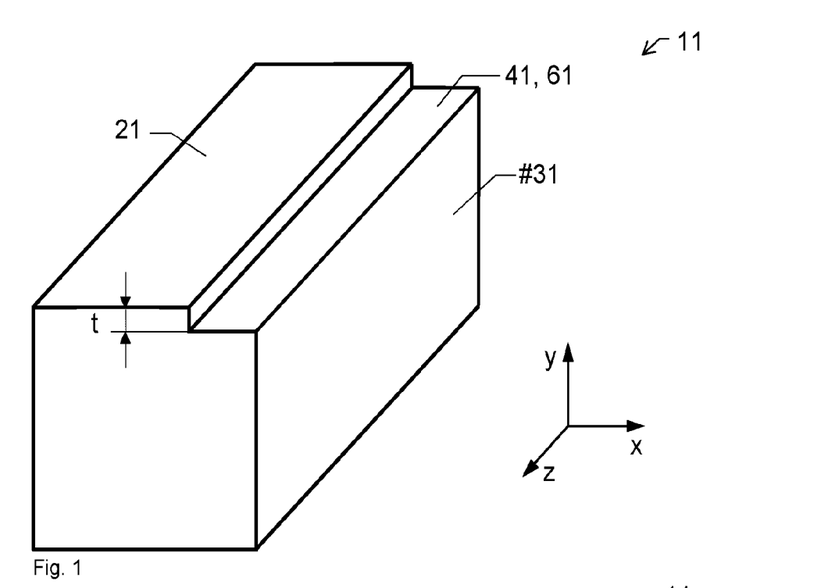
FIG. 1 shows a first individual part.

FIG. 1 shows a first individual part. What is illustrated is a first individual part 11 having a first joining surface $FF_1$ 21 and a first coating surface 51, the first planar partial region 61 of which extends over the entire first coating surface, i.e. is identical with the latter. The coating surface is set back by a parallel offset t relative to the joining surface. A first connection surface 31 is provided on a side surface.

Figure 2:
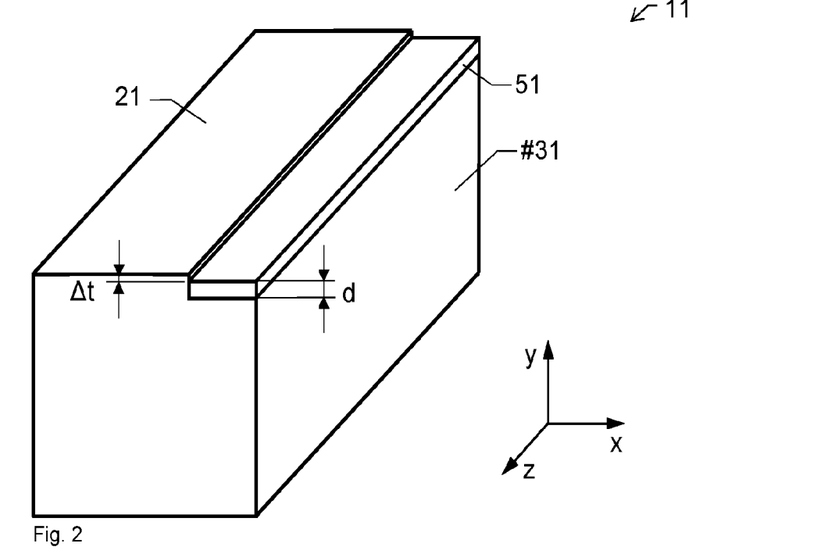
FIG. 2 shows the first individual part with a first coating.

FIG. 2 shows the first individual part with a first coating. Here a first coating 51 having a thickness d is applied to the first coating surface. This results in a parallel offset $\Delta t$ of the coating in relation to the joining surface, said parallel offset being embodied as a set-back offset.

Figure 3:
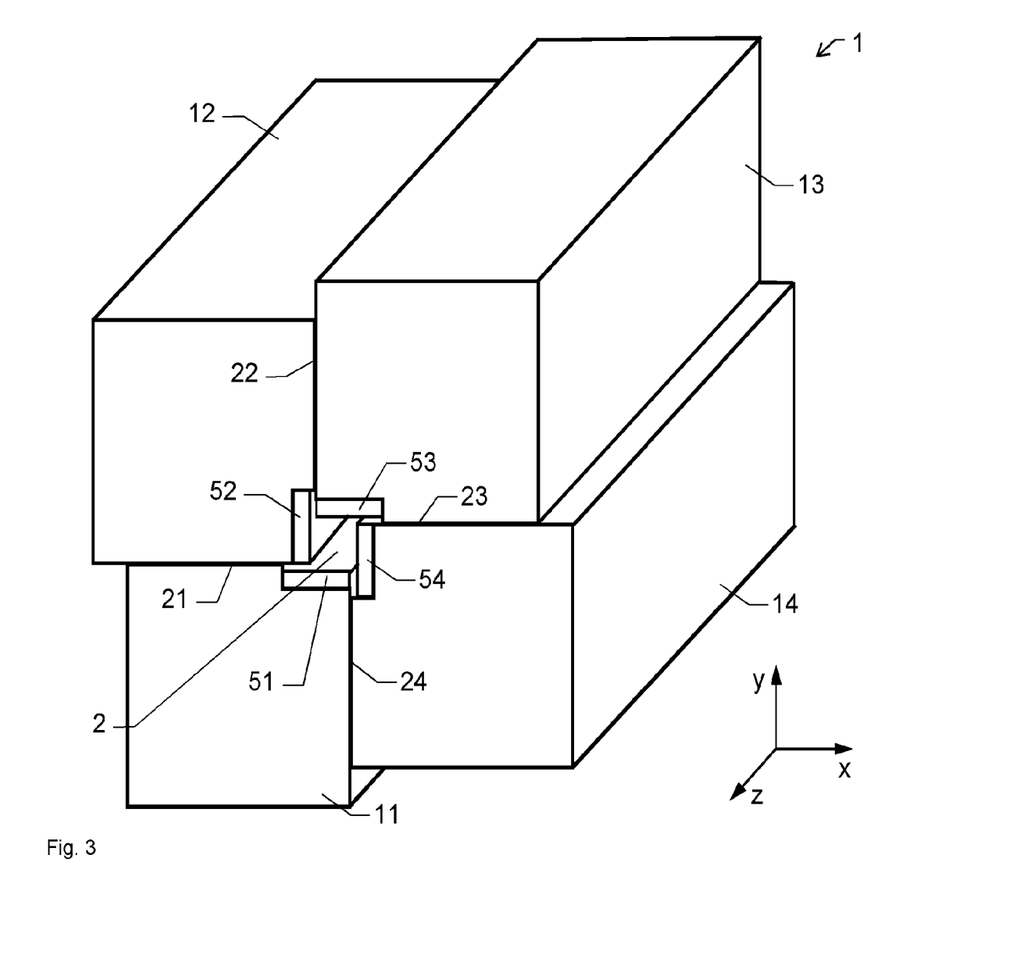
FIG. 3 shows a first exemplary embodiment.

FIG. 3 shows a first exemplary embodiment. Here a first 11, a second 12, a third 13 and a fourth individual part 14 are wrung together at a first 21, a second 22, a third 23 and a fourth joining surface 14. The wringing together arises by the connection surface (mating surface) of the nearest individual part being wrung onto the respective joining surface in a cyclic manner. A cavity 2 is present in the interior of the optical component 1. Apart from narrow gaps at the edge, the cavity is delimited by a first 51, a second 52, a third 53 and a fourth coating 54. The optical component can be a hollow light guide in which the light is guided through within the cavity by way of reflections at the coatings in the z-direction and is possibly homogenized in the process.

Figure 4:
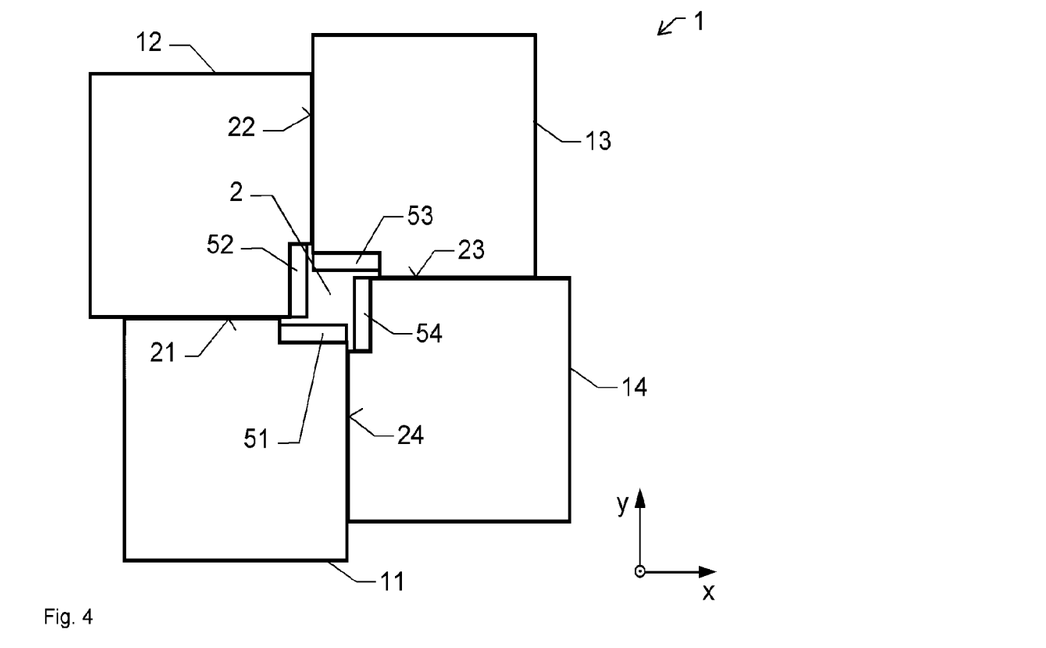
FIG. 4 shows a cross section of the first exemplary embodiment.

FIG. 4 shows a cross section of the first exemplary embodiment. Here the optical component 1 is cut in an xy-plane. The hatchings are not illustrated, for the sake of clarity. A cavity 2 is present in the cross section of the optical component, said cavity being arranged in the interior of the optical component and being surrounded by the four individual parts 11, 12, 13, 14. The coatings represent the delimitation of the cavity.

In a modification of this exemplary embodiment, the component is wrung only at three joining surfaces 21, 22, 23, while the first connection surface simply bears against the fourth joining surface, without being wrung.

Here the joining surfaces are free of coatings, as are the corresponding mating surfaces to be wrung (connection surfaces) of the respectively adjacent individual part.

Figure 5:
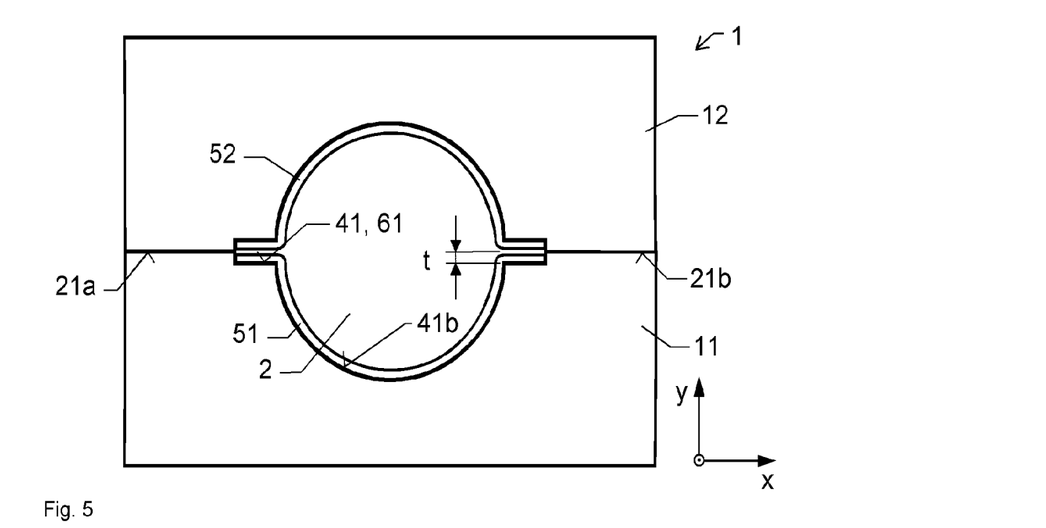
FIG. 5 shows a second exemplary embodiment.

FIG. 5 shows a second exemplary embodiment. This optical component 1 comprises a first 11 and a second individual part 12, which are wrung at two joining surfaces 21a and 21b. These two joining surfaces lie in one plane. These two joining surfaces can also be regarded as a non-contiguous joining surface. The first coating surface 41 has a first planar partial region and a partial surface 41b lying outside said plane and embodied in curved fashion. The first coating 51 and the second coating 52 delimit the cavity. This arrangement can likewise serve as a hollow light guide in the z-direction.

In a modification of the second exemplary embodiment, the arrangement is embodied rotationally symmetrically in the y-direction as a hollow sphere. Such an arrangement can constitute an Ulbricht sphere.

Figure 6:
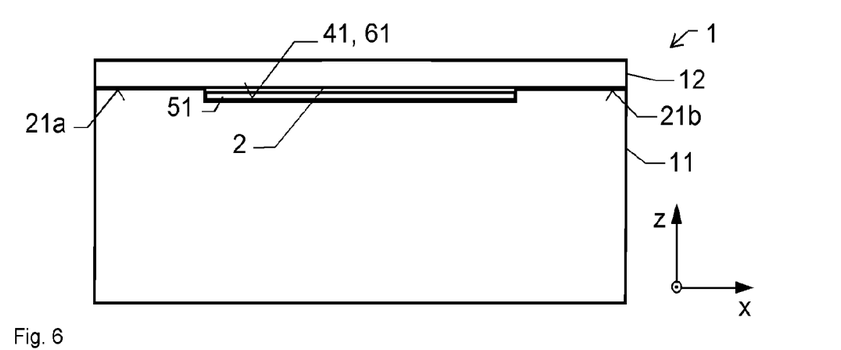
FIG. 6 shows a third exemplary embodiment.

FIG. 6 shows a third exemplary embodiment. Here the light direction is provided in the z-direction. The beam path can be provided through one or both individual parts and/or through the coating. This can constitute a dichroic filter, for example. The cavity 2 here has a thickness corresponding to the parallel offset $\Delta t$.

Figure 7:
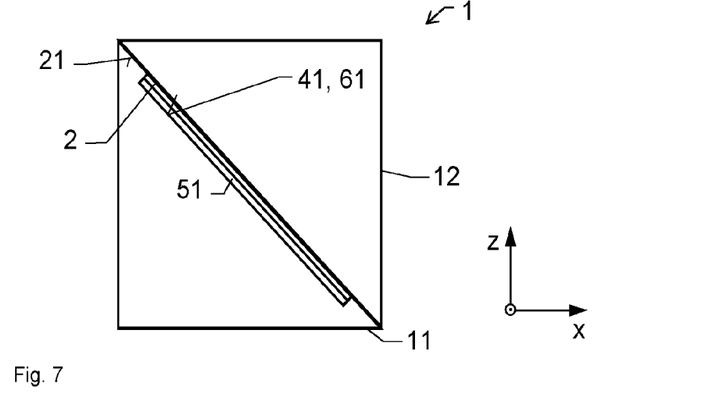
FIG. 7 shows a fourth exemplary embodiment.

FIG. 7 shows a fourth exemplary embodiment. Here the light direction is provided in the z-direction. The beam path can be provided through one or both individual parts 11, 12 and/or through the coating 51. The coating is provided at an angle of 45°, for example, with respect to the beam direction. Such an arrangement can constitute a polarization beam splitter, for example.

It should be pointed out that none of the figures is drawn to scale. In particular, the parallel offset and the thickness of the coatings are illustrated with an exaggerated size.

The reference signs used uniformly in all the figures are as follows:
1. Optical component
2. Cavity
11. First individual part
12. Second individual part
13. Third individual part
14. Fourth individual part
21. First joining surface
22. Second joining surface
23. Third joining surface
24. Fourth joining surface
31. First connection surface
41. First coating surface
51. First coating
52. Second coating
53. Third coating
54. Fourth coating
61. First planar partial region

The invention claimed is:

1. An optical component, comprising a number N of individual parts, which are wrung together at at least N−1 planar joining surfaces by way of molecular or atomic forces of attraction, wherein
   a cavity is present in a cross section of the optical component, said cavity being arranged in the interior of the optical component and being surrounded by the N individual parts, wherein
   a first individual part Eh has at least one first coating surface with a first coating applied thereon and the first coating surface has at least one first planar partial region, and
   the first individual part has at least one first joining surface $FF_1$ from the set of the N−1 joining surfaces, and
   the first coating on the first planar partial region is set back by a parallel offset $\Delta t$ in relation to the first joining surface $FF_1$, and
   the parallel offset $\Delta t$ is less than 200 nm, and
   the first coating is arranged in the interior of the optical component, and
   wherein the optical component is provided for at least one design wavelength and/or a design wavelength range, and the parallel offset $\Delta t$ is less than the design wavelength and/or the minimum value of the design wavelength range.

2. The optical component as claimed in claim 1, wherein the N individual parts are all wrung together at at least N planar joining surfaces.

3. The optical component as claimed in claim 1, wherein the distance between the first coating and a surface of an opposite second individual part is less than half of the design wavelength, and/or in that exactly two individual parts are present and either exactly one joining surface is present or all joining surfaces are arranged in a common plane.

4. The optical component as claimed in claim 1, wherein a further coating surface adjoining the first coating surface is present on the first individual part, and extends outside the plane of the first coating surface.

5. The optical component as claimed in claim 1, wherein at least three individual parts are present and a second coating adjoining the first coating is present on a second individual part from the set of the N individual parts and a third coating adjoining the second coating is present on a third individual part from the set of the N individual parts, and/or in that the cavity, apart from gaps possibly present and having a gap width smaller than the design wavelength and/or the minimum value of the design wavelength range, is completely delimited by coatings.

6. The optical component as claimed in claim 1, wherein the first coating is embodied as at least one of the following coatings:
   partly or completely reflective coating
   antireflection coating
   dichroic coating
   polarization-dependently reflective coating absorbent coating and/or in that the first coating comprises at least one metallic layer and/or at least one inorganic dielectric layer and/or at least one organic layer.

7. The optical component as claimed in claim 1, wherein provision is made of a beam path running through at least one individual part and at least partly through the first coating.

8. The optical component as claimed in claim 1, wherein provision is made of a beam path running completely outside the individual parts in the cavity, and/or in that the cavity is completely or partly delimited by reflective coatings.

9. The optical component as claimed in claim 1, wherein the cavity in the cross section has a shape which is square, rectangular, triangular, pentagonal, hexagonal, round, cylindrical or elliptic.

10. The optical component as claimed in claim 1, wherein the cavity has a cross-sectional area that varies over different cross-sectional planes.

11. A method for producing an optical component as claimed in claim 1, comprising the following steps:
providing N individual parts where N>1 comprising:
providing at least one first individual part having at least one planar first surface on which at least one first coating surface and a first joining surface $FF_1$ are provided,
providing at least one first connection surface $VF_1$ on the first surface or on a first side surface of the first individual part,
providing at least N−1 further individual parts $ET_2 \ldots ET_N$, each having a joining surface $FF_n$ and a connection surface $VF_n$, wherein $n=2 \ldots N$,
superficially removing material by means of a surface processing method in respect of at least the first coating surface as far as a predetermined depth tin relation to the first joining surface,
applying a coating and/or a structure having a predetermined thickness d on the first coating surface, where d≤t holds true,
connecting the individual parts by wringing by way of molecular or atomic forces of attraction a respective joining surface $FF_n$ onto the following joining surface $VF_{n+1}$ where $n=1 \ldots N-1$, such that the first coating surface with the applied first coating and/or structure lies in the interior of the optical component.

12. The method as claimed in claim 11, additionally comprising connecting the last individual part $ET_N$ to the first individual part by wringing the last joining surface $FF_N$ onto the first connection surface $VF_1$.

13. The method as claimed in claim 11, wherein the surface processing method comprises ion beam figuring (IBF), wet-chemical etching, dry-chemical etching, plasma etching and/or zonal polishing.

14. The use of an optical component as claimed in claim 1 for at least one of the following purposes:
a. as polarization beam splitter
b. as dichroic long-pass, short-pass or bandpass filter
c. as hollow light guide
d. as light funnel
e. as diffusor
f. as mirror.

15. An optical component, comprising a number N of individual parts, which are wrung together at at least N−1 planar joining surfaces, wherein
a cavity is present in a cross section of the optical component, said cavity being arranged in the interior of the optical component and being surrounded by the N individual parts, wherein
a first individual part $ET_1$ has at least one first coating surface with a first coating applied thereon and the first coating surface has at least one first planar partial region,
the first individual part has at least one first joining surface $FF_1$ from the set of the N−1 joining surfaces,
the first coating on the first planar partial region is set back by a parallel offset Δt in relation to the first joining surface $FF_1$,
the parallel offset Δt is less than 200 nm,
the first coating is arranged in the interior of the optical component, and
wherein the optical component is provided for at least one design wavelength and/or a design wavelength range, and the parallel offset Δt is less than the design wavelength and/or the minimum value of the design wavelength range.

* * * * *